US008121911B2

(12) United States Patent
Whitehead, Jr. et al.

(10) Patent No.: US 8,121,911 B2
(45) Date of Patent: Feb. 21, 2012

(54) METHOD, COMPUTER PROGRAM PRODUCT AND SYSTEM FOR VERIFYING FINANCIAL DATA

(75) Inventors: James Levi Whitehead, Jr., Montgomery, AL (US); Byron Dale Collier, Wetumpka, AL (US)

(73) Assignee: Regions Asset Company, Wilmington, DE (US)

( * ) Notice: Subject to any disclaimer, the term of this patent is extended or adjusted under 35 U.S.C. 154(b) by 1013 days.

(21) Appl. No.: 12/076,175

(22) Filed: Mar. 14, 2008

(65) Prior Publication Data

US 2008/0172310 A1    Jul. 17, 2008

Related U.S. Application Data

(62) Division of application No. 10/140,731, filed on May 8, 2002, now Pat. No. 7,363,261.

(51) Int. Cl.
*G06F 17/60* (2006.01)
(52) U.S. Cl. ............. 705/30; 705/44; 705/333; 705/317
(58) Field of Classification Search .................... 705/30, 705/44, 317, 333, 500
See application file for complete search history.

(56) References Cited

U.S. PATENT DOCUMENTS

| | | | |
|---|---|---|---|
| 5,117,356 A | 5/1992 | Marks | |
| 5,225,978 A | 7/1993 | Peterson et al. | |
| 5,371,680 A | 12/1994 | Anno et al. | |
| 5,799,286 A | 8/1998 | Morgan et al. | |
| 5,815,829 A | 9/1998 | Zargar | |
| 5,832,447 A | 11/1998 | Rieker et al. | |
| 5,875,435 A | 2/1999 | Brown | |
| 5,920,846 A | 7/1999 | Storch et al. | |
| 5,920,848 A | 7/1999 | Schutzer et al. | |
| 5,930,772 A | 7/1999 | Gomyo et al. | |
| 5,930,773 A | 7/1999 | Crooks et al. | |
| 5,937,395 A | 8/1999 | Iwamura | |
| 6,058,375 A | 5/2000 | Park | |
| 6,088,679 A | 7/2000 | Barkley | |
| 6,088,686 A | 7/2000 | Walker et al. | |
| 6,154,753 A | 11/2000 | McFarland | |
| 6,230,144 B1 | 5/2001 | Kilkki et al. | |
| 6,246,999 B1 | 6/2001 | Riley et al. | |
| 6,311,166 B1 | 10/2001 | Nado et al. | |
| 6,311,192 B1 | 10/2001 | Rosenthal et al. | |
| 6,330,545 B1 | 12/2001 | Suh | |
| 6,334,107 B1 | 12/2001 | Gale et al. | |

OTHER PUBLICATIONS

*Reconcilement Oversight*; PNC Financial Service Group, Inc., Pittsburgh, Pennsylvania; Reconcilement Oversight Presentation Manual; rev. Mar. 8, 2000.

*Primary Examiner* — Vanel Frenel
(74) *Attorney, Agent, or Firm* — Steptoe & Johnson LLP

(57) ABSTRACT

The method, system and computer program product for verifying financial data provides tracking and reporting of the reconciliation and approval process by providing a hierarchical list of users responsible for verification of at least a portion of the financial data and automatically notifying the users responsible for the reconciliation and approval, based upon the hierarchical list, of their duties regarding the account. If the certifier and approver do not certify and/or approve the financial data within a specified timeframe, their supervisors, based upon the hierarchical list, will be automatically notified. In addition, any certification and approval of the financial data is recorded, which permits instantaneous reporting regarding the status of the certification and approval process. Moreover, outstanding issues associated with the financial data may be recorded and tracked, and the appropriate user(s) may be notified of the issue if it is without resolution after a specified timeframe.

33 Claims, 14 Drawing Sheets

FIG. 3.

Account to User Relationships Results
For 062-133-782817

| User ID | Relationship to Account | Escalation Sequence | User Name | Email Address |
|---|---|---|---|---|
| HBK1000 | Primary Certifier | 1 | Anne Holt | aholt@yourbank.com |
| DLA1000 | Primary Approver | 2 | Kim Duck | kduck@yourbank.com |
| ELK1000 | Secondary Approver 1 | 3 | Jerry Easterling | jeasterling@yourbank.com |
| WKJ1000 | Secondary Approver 2 | 4 | Kelly Willis | kwillis@yourbank.com |
| DLA1000 | Business Unit Owner | 5 | James Duck | jduck@yourbank.com |
| WLJ1000 | Above BUO Level 1 | 6 | Anna Whitehead | awhitehead@yourbank.com |
| JBD1000 | Above BUO Level 2 | 7 | Rick Jordan | rjordan@yourbank.com |
| HDR1100 | Above BUO Level 3 | 8 | Bryan Horsley | bhorsely@yourbank.com |
| JEC1000 | Above BUO Level 4 | 9 | Holt Jones | hjones@yourbank.com |

FIG. 5.

Certification User List - 12/01
Anne Holt

| Co | CC | Account | Acct Title | Balance | Cert Date | Certifier | Certify Checked |
|---|---|---|---|---|---|---|---|
| 062 | 0 | 007651 | HOMEOWNER EMPLOYEE LOAN PROGRA | $0.00 | 01-15-2002 | Anne Holt | ☐ |
| 062 | 788 | 068851 | CAP. LN FEE/COST-EA LINE LN | $8,090,600.00 | 01-15-2002 | Anne Holt | ☐ |
| 062 | 999 | 036581 | ACCRUED SERVICE CHARGES | $0.00 | 01-15-2002 | Anne Holt | ☐ |
| 062 | 087 | 008581 | OTHER ACCRUED INCOME | $1,500,000.00 | 01-15-2002 | Anne Holt | ☐ |
| 062 | 999 | 078762 | ACCRUED DIRECTORS FEES | $0.00 | 01-15-2002 | Anne Holt | ☐ |
| 062 | 133 | 009762 | OTHER ACCRUED EXPENSE | ($92,916.70) | 01-15-2002 | Anne Holt | ☐ |
| 793 | 888 | 000154 | UNDIVIDED PROFITS | $773,515.31 | | | ☐ |
| 793 | 2924 | 000154 | UNDIVIDED PROFITS | ($1,525,353.00) | | | ☐ |
| 309 | 1479 | 000114 | COMMON STOCK | ($8,892,000.00) | 01-15-2002 | Anne Holt | ☐ |
| 129 | 1129 | 000114 | COMMON STOCK | ($1,000.00) | 01-15-2002 | Anne Holt | ☐ |
| 129 | 1129 | 000034 | SURPLUS | ($149,001.00) | | | ☐ |
| 129 | 888 | 000154 | UNDIVIDED PROFITS | ($70,561,411.88) | | | ☐ |
| 129 | 1129 | 000154 | UNDIVIDED PROFITS | ($26,775,320.01) | | | ☐ |
| 229 | 2129 | 000114 | COMMON STOCK | ($1,000.00) | | | ☐ |
| 229 | 2129 | 000034 | SURPLUS | ($5,182,952,300.00) | | | ☐ |
| 229 | 2129 | 000154 | UNDIVIDED PROFITS | ($411,360,482.39) | | | ☐ |
| 229 | 888 | 000154 | UNDIVIDED PROFITS | ($272,028,667.82) | | | ☐ |
| 329 | 2129 | 000154 | UNDIVIDED PROFITS | $1,000.00 | | | ☐ |
| 329 | 3129 | 000114 | COMMON STOCK | $119,001.00 | | | ☐ |
| 329 | 3129 | 000034 | SURPLUS | ($123,672,779.71) | | | ☐ |
| 329 | 888 | 000154 | UNDIVIDED PROFITS | $1,000.00 | | | ☐ |
| 429 | 4129 | 000114 | COMMON STOCK | $19,000.00 | | | ☐ |
| 429 | 4129 | 000034 | SURPLUS | | | | ☐ |

Account History for 620-355651
CONSUMER LOAN OPERATIONS (LR)
STUDENT AID LNS-NON-YOURBANK AP

| GL Data | 11-30-2001 | 10-31-2001 | 09-30-2001 | 08-31-2001 |
|---|---|---|---|---|
| Ending Balance | 25,728.00 | $25,728.00 | $25,728.00 | $25,728.00 |
| Current Status | OPEN | OPEN | OPEN | OPEN |
| Reg. Bal | $25,728.00 | $25,728.00 | $25,728.00 | $25,728.00 |
| Calendar Eom Bal | $25,728.00 | $25,728.00 | $25,728.00 | $25,728.00 |
| Retro EOM Bal | $25,728.00 | $25,728.00 | $25,728.00 | $25,728.00 |
| Date Last Dollar Entry | 01-04-2000 | 01-04-2000 | 01-04-2000 | 01-04-2000 |
| Date Last Main | 02-24-1999 | 02-24-1999 | 02-24-1999 | 02-24-1999 |
| Total Dr $ | $0.00 | $0.00 | $0.00 | $0.00 |
| Total Dr # | 0 | 0 | 0 | 0 |
| Total Cr $ | $0.00 | $0.00 | $0.00 | $0.00 |
| Total Cr # | 0 | 0 | 0 | 0 |
| Total CGE Dr $ | $0.00 | $0.00 | $0.00 | $0.00 |
| Total CGE Dr # | 0 | 0 | 0 | 0 |
| Total CGE Cr $ | $0.00 | $0.00 | $0.00 | $0.00 |
| Total CGE Cr # | 0 | 0 | 0 | 0 |
| Total Manual Dr $ | $0.00 | $0.00 | $0.00 | $0.00 |
| Total Manual Dr # | 0 | 0 | 0 | 0 |
| Total Manual Cr $ | $0.00 | $0.00 | $0.00 | $0.00 |
| Total Manual Cr # | 0 | 0 | 0 | 0 |
| Highest Bal | $25,728.00 | $25,728.00 | $25,728.00 | $25,728.00 |
| Lowest Bal | $25,728.00 | $25,728.00 | $25,728.00 | $25,728.00 |
| Business Unit Owner | Kim Duck | Kim Duck | Kelly Willis | Rick Jordan |

FROM FIG. 7A.

| YOURBANK Data | | | |
|---|---|---|---|
| Certification Date | 12-17-2001 | 12-17-2001 | Not Certified | Not Certified |
| Certifier | Anna Whitehead | Anna Whitehead | Not Certified | Not Certified |
| Approval Date | 12-17-2001 | 12-17-2001 | Not Approved | Not Approved |
| Approver | Bryan Horsley | Kim Duck | Not Approved | Not Approved |
| Aging Approval Date | None | None | None | None |
| Aging Approver | None | None | None | None |
| Date Of Last Notify | Not Notified | Not Notified | Not Notified | Not Notified |
| Aging Schedule (Days) | | | | |
| DR<30 # | 0 | 0 | 0 | 0 |
| DR<30 $ | $0.00 | $0.00 | $0.00 | $0.00 |
| DR 30-89 # | 0 | 0 | 0 | 0 |
| DR 30-89 $ | $0.00 | $0.00 | $0.00 | $0.00 |
| DR 90-149 # | 0 | 0 | 0 | 0 |
| DR 90-149 $ | $0.00 | $0.00 | $0.00 | $0.00 |
| DR 150&> # | 1 | 1 | 1 | 1 |
| DR 150&> $ | $25,728.00 | $25,728.00 | $25,728.00 | $25,728.00 |
| CR<30 # | 0 | 0 | 0 | 0 |
| CR<30 $ | $0.00 | $0.00 | $0.00 | $0.00 |
| CR 30-89 # | 0 | 0 | 0 | 0 |
| CR 30-89 $ | $0.00 | $0.00 | $0.00 | $0.00 |
| CR 91-149 # | 0 | 0 | 0 | 0 |
| CR 91-149 $ | $0.00 | $0.00 | $0.00 | $0.00 |
| CR 150&> # | 0 | 0 | 0 | 0 |
| CR 150&> $ | $0.00 | $0.00 | $0.00 | $0.00 |
| Memo: | Conversion entry-written off and acct closed | Conversion entry-written off and acct closed Dec | | |

[Back]

| Co | CC | Account | Acct Title | Balance | Cert Date | Certifier | Approval Date | Approver | Approval Checked Approve |
|---|---|---|---|---|---|---|---|---|---|
| 100 | 88 | 099991 | SUSPENSE ASSETS | $0.00 | 12-12-2001 | Dick Taylor | 12-12-2001 | Rick Jordan | ☐ |
| 100 | 88 | 030862 | ACCRUED FRANCHISE TAX | ($130,020.00) | 01-03-2002 | Wendy Pace | 01-10-2002 | Jerry Easterling | ☐ |
| 100 | 0 | 002862 | FED & STATE INC TAXES-CURRENT | ($20,823,992.50) | 01-03-2002 | Wendy Pace | | | ☐ |
| 100 | 0 | 004862 | DEFERRED TAXES-LEASING | $3,450,351.04 | 01-09-2002 | Wendy Pace | | | ☐ |
| 100 | 0 | 006862 | FEDERAL INCOME TAX-CLEARING AC | $11,056,376.89 | 01-03-2002 | Wendy Pace | | | ☐ |
| 100 | 88 | 099993 | SUSPENSE LIABILITIES | $0.00 | 12-12-2001 | Carlos Taylor | 12-12-2001 | Rick Jordan | ☐ |
| 620 | 888 | 022111 | CASH BALANCING SUSPENSE | $0.00 | 12-12-2001 | Becky Arrington | 12-12-2001 | Rick Jordan | ☐ |
| 620 | 146 | 004721 | OTHER BONDS, NOTES & DEBENTURE | $9,010.10 | 12-13-2001 | Kelly White | 12-13-2001 | Rick Jordan | ☐ |
| 620 | 9864 | 355651 | STUDENT AID LNS-NON-YOURBANK AP | $25,728.00 | 12-17-2001 | Carlos Taylor | 12-17-2001 | James Duck | ☐ |
| 620 | 3884 | 059281 | LOANS TO SUBS OR AFFILIATES | ($2,277,976.42) | | | | | ☐ |
| 620 | 888 | 003881 | PREPAID FDIC INSURANCE | $437,952.95 | 12-13-2001 | Dick Taylor | 12-14-2001 | Rick Jordan | ☐ |
| 620 | 888 | 004881 | OTHER PREPAID INSURANCE | $354,205.56 | 12-14-2001 | Becky Arrington | 12-14-2001 | Rick Jordan | ☐ |
| 620 | 888 | 104881 | PREPAID LIAB D&O INS | $2,5 2,849.66 | 12-14-2001 | Wendy Pace | 12-14-2001 | Rick Jordan | ☐ |
| 620 | 888 | 204881 | PREPAID WORKERS COMP INS | $71,468.81 | 12-14-2001 | Dick Taylor | 12-14-2001 | Rick Jordan | ☐ |
| 620 | 888 | 304881 | PREPAID PROPERTY INS | $789,646.66 | 12-14-2001 | Dick Taylor | 12-14-2001 | Rick Jordan | ☐ |
| 620 | 888 | 404881 | PREPAID AUTO INS | $268,453.32 | 12-14-2001 | Becky Arrington | 12-14-2001 | Rick Jordan | ☐ |
| 620 | 888 | 504881 | PREPAID BOND INS | $790,909.78 | 12-14-2001 | Becky Arrington | 12-14-2001 | Rick Jordan | ☐ |
| 620 | 0406 | 050961 | ACCTS REC-AFFILIATES | $0.01 | 12-14-2001 | Kelly White | 12-14-2001 | Rick Jordan | ☐ |
| 620 | 888 | 999991 | SUSPENSE ASSENTS | $0.00 | 12-12-2001 | Kelly White | 12-12-2001 | Bryan Horsley | ☐ |
| 620 | 0 | 013522 | STATE TREASURER-TERM DEPOSIT | ($18,255,000.00) | 12-18-2001 | Carlos Taylor | 01-11-2002 | Bryan Horsley | ☐ |
| 620 | 0 | 043522 | STATE OF ALA-LINKED DEPOSIT | ($5,056,498.08) | 12-31-2001 | Carlos Taylor | 01-11-2002 | Holt Jones | ☐ |
| 620 | 0 | 053522 | STATE DEPOSIT | ($20,747,740.00) | 12-18-2001 | Wendy Pace | 01-11-2002 | Holt Jones | ☐ |

Aged Items Requiring Additional Approval - 10/01
Anne Holt

| Co | CC | Account | Acct Title | Aging Totals | >150 | Approval Date | Approver | Additional Approval Date | Additional Approver |
|---|---|---|---|---|---|---|---|---|---|
| 100 | 88 | 558781 | INVESTMENT IN CARBUSK$ | $25,000 | $0 | 12-28-2001 | Melanie Arndt | 12-31-2001 | Rick Jordan |
| 100 | 5791 | 006881 | SUPPLIES INVENTORY | $222,242 | $0 | 12-31-2001 | Melanie Arndt | 01-02-2002 | Rick Jordan |
| 100 | 88 | 255762 | 2001 ACCR PROFIT SHARING CONT | $0 | $28,710 | 12-18-2001 | Robert DeJohn | | |
| 100 | 8888 | 050782 | ACCOUNTS PAYABLE | $0 | $81,045 | 12-04-2001 | Melanie Arndt | | |
| 620 | 2184 | 004111 | CASH IN TRANSIT | $20 | 40 | 12-20-2001 | Ken Wish | | |
| 620 | 2544 | 054111 | INTRABANK CASH TRANS | $0 | $1,000 | 12-19-2001 | Kevin Eperson | | |
| 620 | 7033 | 092611 | MY BANK/MC/VISA | $249 | $3,206 | 12-17-2110 | Ken Wish | | |
| 620 | 3033 | 009611 | AMERICAN BANK - SARATOGA | $0 | $6,954 | 01-03-2001 | Melanie Arndt | 01-03-2002 | Rick Jordan |
| 620 | 283 | 010911 | ELECTRONIC CASH ADVANCES | $4,661 | $632 | 12-12-2001 | Melody Kilpatrick | | |
| 620 | 866 | 010911 | ELECTRONIC CASH ADVANCES | $5,275 | $1,200 | 12-18-2001 | Michelle Wilburn | | |
| 620 | 127 | 010911 | ELECTRONIC CASH ADVANCES | $6,576 | $6,050 | 12-18-2001 | Michelle Wilburn | | |
| 620 | 227 | 010911 | ELECTRONIC CASH ADVANCES | $30 | $400 | 12-18-2001 | Michelle Wilburn | | |
| 620 | 327 | 010911 | ELECTRONIC CASH ADVANCES | $9,030 | $6,029 | 12-18-2001 | Michelle Wilburn | | |
| 620 | 828 | 010911 | ELECTRONIC CASH ADVANCES | $100 | $100 | 12-18-2001 | Michelle Wilburn | | |
| 620 | 927 | 010911 | ELECTRONIC CASH ADVANCES | $300 | $0 | 12-18-2001 | Michelle Wilburn | | |
| 620 | 037 | 010911 | ELECTRONIC CASH ADVANCES | $7,206 | $5,159 | 12-18-2001 | Michelle Wilburn | | |
| 620 | 437 | 010911 | ELECTRONIC CASH ADVANCES | $20 | $590 | 12-18-2001 | Michelle Wilburn | | |
| 620 | 838 | 010911 | ELECTRONIC CASH ADVANCES | $670 | $325 | 12-18-2001 | Michelle Wilburn | | |
| 620 | 837 | 010911 | ELECTRONIC CASH ADVANCES | $0 | $211 | 12-18-2001 | Michelle Wilburn | | |
| 620 | 937 | 010911 | ELECTRONIC CASH ADVANCES | $1,834 | $6,459 | 12-18-2001 | Michelle Wilburn | | |

YOURBANK Management Report for Oct. 2001
Summary by Business Unit Owner

| Grp | BUO | | # Accts | Balance (000's) | % Certified # | % Certified $ | % Approved # | % Approved $ | Approved $ >90 days (000's) Debit | Approved $ >90 days (000's) Credit |
|---|---|---|---|---|---|---|---|---|---|---|
| 1 | Brad Abrams | D | 69 | $7,457 | 100% | 100% | 100% | 100% | $424 | $0 |
| | | C | 32 | $(330) | 100% | 100% | 100% | 100% | $1 | $0 |
| 1 | Warren Amagost | D | 3 | $56 | 100% | 100% | 100% | 100% | $1 | $0 |
| | | C | | $(5) | 100% | 100% | 100% | 100% | $0 | $5 |
| 1 | Lynn Dondinger | D | 183 | $29,214 | 100% | 100% | 100% | 100% | $813 | $418 |
| | | C | 87 | $(1,930) | 100% | 100% | 100% | 100% | $596 | $812 |
| 1 | Scott Harrison | D | 65 | $4,034 | 100% | 100% | 100% | 100% | $968 | $0 |
| | | C | 31 | $(523) | 100% | 100% | 100% | 100% | $0 | $36 |
| 1 | Dianne Kilpatrick | D | 511 | $5,223 | 100% | 100% | 100% | 100% | $946 | $20 |
| | | C | 13 | $(114) | 100% | 100% | 100% | 100% | $3 | $11 |
| 1 | Michelle Harrison | D | 622 | $15,748 | 100% | 100% | 100% | 100% | $0 | $0 |
| | | C | 15 | $(380) | 100% | 100% | 100% | 100% | $27 | $1 |
| 1 | Christy Sawyer | D | 454 | $24,623 | 100% | 100% | 100% | 100% | $0 | $0 |
| | | C | 26 | $(486) | 100% | 100% | 100% | 100% | $29 | $1 |
| 1 | Faye Wattenberger | D | 68 | $4,323 | 100% | 100% | 100% | 100% | $0 | $0 |
| | | C | 82 | $(569) | 100% | 100% | 100% | 100% | $13 | $1 |
| 1 | Debbie Wilburn | D | 382 | $22,681 | 100% | 100% | 100% | 100% | $3 | $2 |
| | | C | 75 | $(1,990) | 100% | 100% | 100% | 100% | $3,221 | $439 |
| Group 1 Totals | | D | 8061 | $113,360 | 100% | 100% | 100% | 100% | $604 | $867 |
| 2 | Shirley Atterholt | D | 443 | $6,326 | 100% | 100% | 100% | 100% | $2,235 | $285 |
| | | C | 999 | $82,697 | 100% | 100% | 100% | 100% | $53 | $136 |
| 2 | Sherrie Martin | D | 162 | $(7,957) | 100% | 100% | 100% | 100% | $17 | $10 |
| | | C | 474 | $22,742 | 100% | 100% | 100% | 100% | | |

FIG. 12.

YOURBANK Custom Inquiry

Select the following options:

| | | | |
|---|---|---|---|
| Date YYYYMMDD: | 20011101 | through | 20011201 |
| Company: | 000 | through | 999 |
| Region: | 000 | through | 999 |
| Bank: | 000 | through | 999 |
| Cost Center: | 00000 | through | 99999 |
| Account Number: | 000000 | through | 999999 |
| Recon Balance: | -99999999999.99 | through | 99999999999.99 |
| Select by User Hierarchy | Yes ● No ○ | RGBK ID: | eam0970 |
| Show Primary Certifier: | Yes ○ No ● | | |
| Certified: | Yes ○ No ○ N/A ● | | |
| Approved: | Yes ○ No ○ N/A ● | | |
| Aging Schedule: | <30 | | |
| | 30-89 | | |
| | 90-149 | | |
| | 150&> | | |
| To select more than one, hold Cut key down | Submit Query | Reset Form | |

METHOD, COMPUTER PROGRAM PRODUCT AND SYSTEM FOR VERIFYING FINANCIAL DATA

CLAIM OF PRIORITY

This application is a divisional of U.S. patent application Ser. No. 10/140,731, filed May 8, 2002, now U.S. Pat. No. 7,363,261 which is hereby incorporated by reference.

BACKGROUND OF THE INVENTION

The present invention relates to verifying that financial data is accurate, and in particular, to tracking and reporting the verification and approval process in addition to tracking and reporting other user-defined issues associated with the accuracy of the data. Many businesses receive large amounts of financial data on a daily or other frequent basis. The businesses include not only banks, saving and loan companies, mortgage companies, investment firms, brokerage companies, insurance companies, and the like, but also any type of business that manages multiple internal and/or external accounts, regardless of the size of the business. The financial data may be associated with some aspect of the business itself or with a division or subsidiary of the business. In either situation, the financial data may be segregated into sub-groups, which may be referred to by an arbitrary designation, such as an account number, or cost center.

The business typically maintains a general ledger system with balance sheets for each sub-group of financial data. The changes to the financial data of the sub-group are recorded in the sub-group's balance sheet as they occur. Generally, at a later time, such as once a month or once a quarter, the balance sheet is reconciled against the underlying documentation supporting the changes in the balance sheet to ensure the balance sheet is a correct representation of the sub-group's financial status.

For instance, in the banking industry, a bank maintains a balance sheet for each account to record all of the transactions associated with the account on a day-to-day basis. The underlying documentation supporting the value of the asset or liability associated with the transaction is then analyzed on a daily, weekly or other basis to ensure that the values recorded in the balance sheet are supported by and reconcile with the underlying transaction documentation. This process is termed the reconciliation of the account.

Although reconciling the balance sheet against the underlying transaction documentation is an important function of the business, in the conventional process, no way exists to efficiently ensure the accuracy of the reconciliation for all of the sub-groups or accounts. Even if the reconciliation is reviewed and approved by another individual, there is no way to track the reconciliation and approval process and to ensure all of the sub-groups or accounts are receiving the correct type of analysis at the end of the specified period. In a business with multiple sub-groups or accounts, it would take a significant amount of time to track and ensure that the reconciliation and approval process was performed appropriately at the end of each specified period because each sub-group or account would have to be accessed and checked individually.

In addition, during the reconciliation procedure, outstanding issues may be identified regarding the account. Some of these issues may be resolved immediately, but others may be set aside for resolution at a later time. For example, in a bank account, a transaction may not have cleared at the time of reconciliation, but it would be reasonable to assume that it will clear in the next few days through the normal banking channels. In this situation, the transaction will be recorded in a separate document associated with the account, such as an "aging schedule." The aging schedule will be revisited during the next reconciliation to determine if the transaction has already cleared or if it is an issue that must be resolved at that time.

In the conventional reconciliation procedures, there does not exist a way to monitor the issues that are set aside for resolution at a later time. Many times these issues are not addressed until it is too late to resolve them because they may be overlooked at the next reconciliation period or because of a lack of accountability for the issue by the person responsible for resolution. Additionally, there is no efficient and accurate way to track all of the outstanding issues or to track who the individuals are that authorized setting the issues aside to be resolved at a later date. In the conventional process, all of the files or documents associated with each sub-group or account would have to be accessed individually in order to track the status of the outstanding issues.

Thus, there exists a need in the industry for a system that tracks and reports the reconciliation and approval process and provides instantaneous reporting regarding the status of the process. In addition, there exists a need for a system to track and report all of the outstanding issues associated with all of the sub-groups or accounts managed by a business such that the issues can be addressed before it is too late to resolve them properly.

BRIEF SUMMARY OF THE INVENTION

The present invention of a method, system and computer program product for verifying financial data provides tracking and reporting of the reconciliation and approval process by recording the certification and approval of reconciliation by the users responsible for reconciliation of the account. The present invention also permits instantaneous reporting regarding the status of the financial data associated with the account and the status of the certification and approval process. Moreover, the method, system and computer program product of the present invention are capable of tracking the outstanding issues associated with the financial data managed by a business. As such, the appropriate user or users may be notified of the issue if it is without resolution after a specified timeframe and prevent the issue from being inadvertently overlooked until it is too late to properly resolve it. Thus, the method, system and computer program product for verifying financial data of the present invention track the actions of the users responsible for the verification of the financial data and allow businesses to manage large amounts of financial data in an efficient and timely manner.

The method, system and computer program product for verifying financial data provide a hierarchical list of users responsible for verification of at least a portion of the financial data. The hierarchical list defines the relationships among the users. The method, system and computer program product also automatically notify at least one user, based upon the hierarchical list, to reconcile the financial data and at least one user, based upon the hierarchical list, to approve the reconciled financial data once the financial data has been reconciled and certified. In addition, any certification and approval of the financial data is recorded.

The method of the present invention also includes analyzing the financial data to determine if the financial data is reconcilable and, if so, certifying the reconciliation of the financial data. The method also analyzes the reconciliation of the financial data to determine if the reconciliation is to be approved.

The system of the present invention comprises a client that includes a browser for receiving input from and providing output to a user. The system also includes a server in communication with the client via a computer network. The system further includes a memory device in communication with the server for storing the hierarchical list, and a processing element in communication with the server for providing the automatic notifications and receiving the responses, such as certifications and/or approvals, as described above.

Various embodiments of the method, system and computer program product of the present invention may include some or all of the following features. Comments by the user performing either the certification or the approval and/or by any user accessing the recordation of the certification and approval of the financial data may also be recorded. If so, the respective user may choose that the comments may be viewed only by the user making the comments, by all other users, or only by a specified group of at least one user.

The financial data may be organized into accounts, and each account may be associated with at least one user for certification and at least one user for approval. Profile information defining a level of access to the financial data available to each user may also be provided, and reports may be prepared for a respective user having content based upon the level of access defined by the profile information for the respective user. The reports may also contain links to other information associated with the financial data presented in the reports. In particular, the user responsible for reconciliation is typically permitted to access the financial data required to reconcile the account.

Issues associated with the financial data may also be recorded. Then, if an issue associated with the financial data is not resolved by a specified timeframe, the method, system and computer program product of the present invention may automatically notify at least one user, based upon the hierarchical list, that the issue is not resolved. This additional notification permits timely resolution of issues associated with the financial data.

Furthermore, the method, system and computer program product of the present invention may detect when new financial data is received and may automatically notify the at least one user responsible for certification in response to the detection of the new financial data. If the financial data is without certification and/or approval for a specified timeframe, at least one additional user, based upon the hierarchical list, may also be automatically notified. More than one additional user may be notified based upon a schedule that specifies a timeframe to wait before notifying the next user on the hierarchical list when the financial data continues to be without certification and/or approval. Any of the automatic notifications described above may be electronic mail notifications.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a representative display of a hierarchical list of the users responsible for a particular account according to one embodiment of the present invention;

FIG. 5 is a representative display of a list of accounts associated with a person responsible for reconciling the accounts and certifying that the accounts have been reconciled according to one embodiment of the present invention;

FIG. 7 is a representative display of an account history report for a particular account according to one embodiment of the present invention;

FIG. 8 is a representative display of a list of accounts associated with a person responsible for approving the reconciliation of the accounts according to one embodiment of the present invention;

FIG. 10 is a representative display of issues associated with an account that require additional approval, according to one embodiment of the present invention;

FIG. 11 is a representative display of a management summary report according to one embodiment of the present invention;

FIG. 12 is a representative display of a custom inquiry screen with user prompts to generate a custom report according to one embodiment of the present invention; and FIG. 13 is a representative display of a custom report based upon a custom inquiry entered into a custom inquiry screen of FIG. 12 according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The method, computer program product and system for verifying financial data of the present invention effectively create accountability and track the reconciliation and approval process by automatically notifying the responsible users of their duties and recording the actions taken by those users. The financial data may be organized into accounts or other sub-groups, and users may record issues regarding the financial data and/or account for resolution at a later time and may provide comments regarding the financial data or accounts. In addition, the method, computer program product and system for verifying financial data provide reporting functionality such that any authorized user may access the financial data, including the records of the reconciliation and approval process, issues, and/or comments, in order to assess the status of the financial data and/or the account(s).

Figure 1:
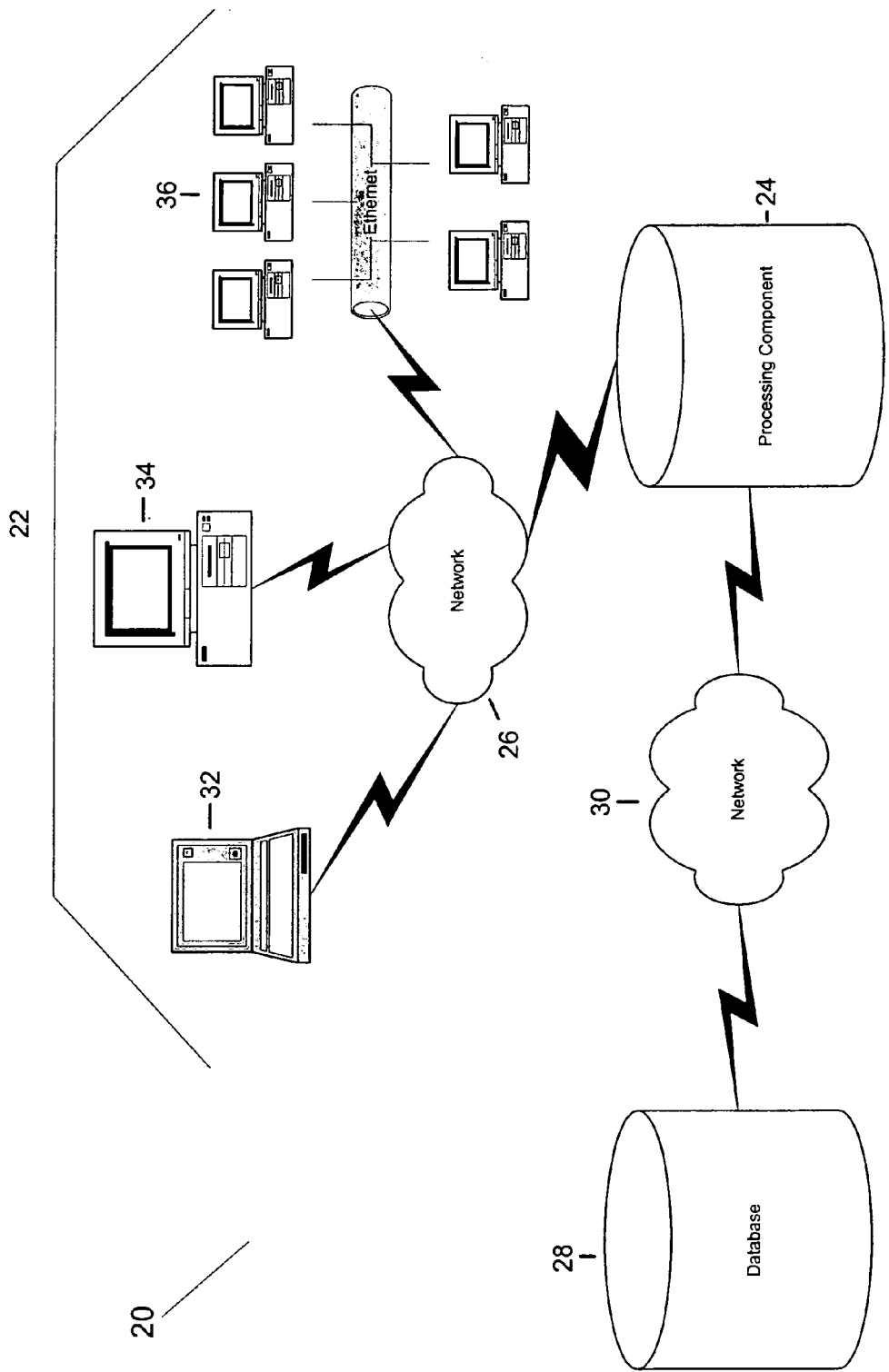
FIG. 1 is a diagram of one example of the network elements that may be utilized to implement the method, computer program product, and system of the present invention.

FIG. 1 is a network diagram of the method, system 20 and computer program product for verifying financial data of one embodiment of the present invention. The system 20 typically includes a client component 22 and a server connected via a computer network 26. For example, the server may be a web server and an application server that may be located on the same physical device or the web server may be separate from and in communication with the application server via the Internet, intranet or any other computer network. The system 20 also generally includes a processing component 24. As shown in FIG. 1, the processing component 24 of one embodiment may be embodied by the server, such as the web server and/or the application server. The client component 22 and the processing component 24 and, in one embodiment, the web and application server(s) of the processing component 24 may be distributed as parts of different workstations, computers, servers or computing devices that may be in different physical locations and in communication with each other via the Internet, intranet or other computer network 26. To be consistent, the discussion hereinafter refers to the different components of the system 20 as being distributed, unless otherwise stated. In an alternative embodiment, however, the client component 22 and the processing component 24 may be part of a single workstation, computer, server or other computing device and, as such, may communicate with each other via internal transmissions.

The database 28 of the financial data verification system 20 may be part of the client component 22, the server, and/or the processing component 24, or most likely, may be separate from the client component 22, the server, and the processing components and in communication with one or all of the components via the Internet, intranet or other computer network 30. Regardless of the configuration, the database 28 is accessed by other elements of the financial data verification system 20 via an interface, such as active data object (ADO) interface or open database connectivity (ODBC) interface.

The client component 22 represents the device or devices that include the browser interface that users of the financial verification system 20 may utilize to perform their duties regarding the financial data, request records of the status of the financial data, and/or to record issues and/or comments regarding the financial data. The client component 22 may be a laptop computer 32, a personal computer or workstation 34, networked personal computers or workstations 36, or any other type of computing device or configuration operating on any type of computer platform and capable of supporting a browser interface. The browser interface is generally an Internet browser, but other browser interfaces capable of appropriately displaying the financial data, soliciting user input, and communicating with the computer network 26 may be utilized if desired. The system 20 may include many client components 22 such that many users may utilize the financial data verification system 20. The client component(s) 22 may physically be located anywhere as long as the client component(s) 22 are in communication with the processing component via the Internet, intranet or other computer network 26.

As described above, the processing element 24 of one advantageous embodiment includes a web and application server, which may utilize any modem operating system, such as Microsoft Windows, and any modem web development platform, such as ColdFusion, commercially available from Macromedia, Inc. The application program may reside on the web and application server(s). Among other functions, the application program provides the information required to perform a task and/or the requested information regarding a particular account to the client component 22 in any appropriate form, such as a web page form having predefined fields. The form is viewed by the user as "screens" via client component 22 and the browser interface including, for example, a display. As known to those skilled in the art, the screens may be interactive and prompt the user for the action or information necessary for the financial data verification system 20 to record and report the status of the financial data. After the user submits responses to the prompts provided by a screen and/or selects certain options presented on the screen, the application program can determine the content and prompts to be provided by successive screens. The application program may access/query the database 28 to provide the content for any of the screens, based upon the actions taken by the user and/or the request of the user. For example, if the particular user is to perform a task regarding the financial data, the application program provides a screen to the user containing the information from the database associated with the task and prompting the user to perform the task. Furthermore, if the particular user requests a report regarding the financial data, the application program receives the request from the user via a screen, queries the database 28 for the requested information, populates and formats another screen containing the requested information, and submits the screen to the client component 22 for viewing by the user via the browser interface.

The database 28 may contain a variety of stored information, including the financial data and any other information regarding the users, timeframes, and accounts associated with the financial data. The database may be any type of modern database, such as Sequel or Oracle. The data may be stored in tables in the database. The tables may include a users' table that contains profile information for each user of the financial data verification system 20. The profile information for a user may include information about the user, such as a userID or username and any contact information, and may define the user's level of access to the financial data and other administrative or maintenance functions associated with the system 20. Because the profile information for a particular user may be associated with the user ID or other username, the application program may access the user's profile information and provide the appropriate level of access to the data and/or functions of the system 20 when the user logs onto the system 20.

Figure 2:
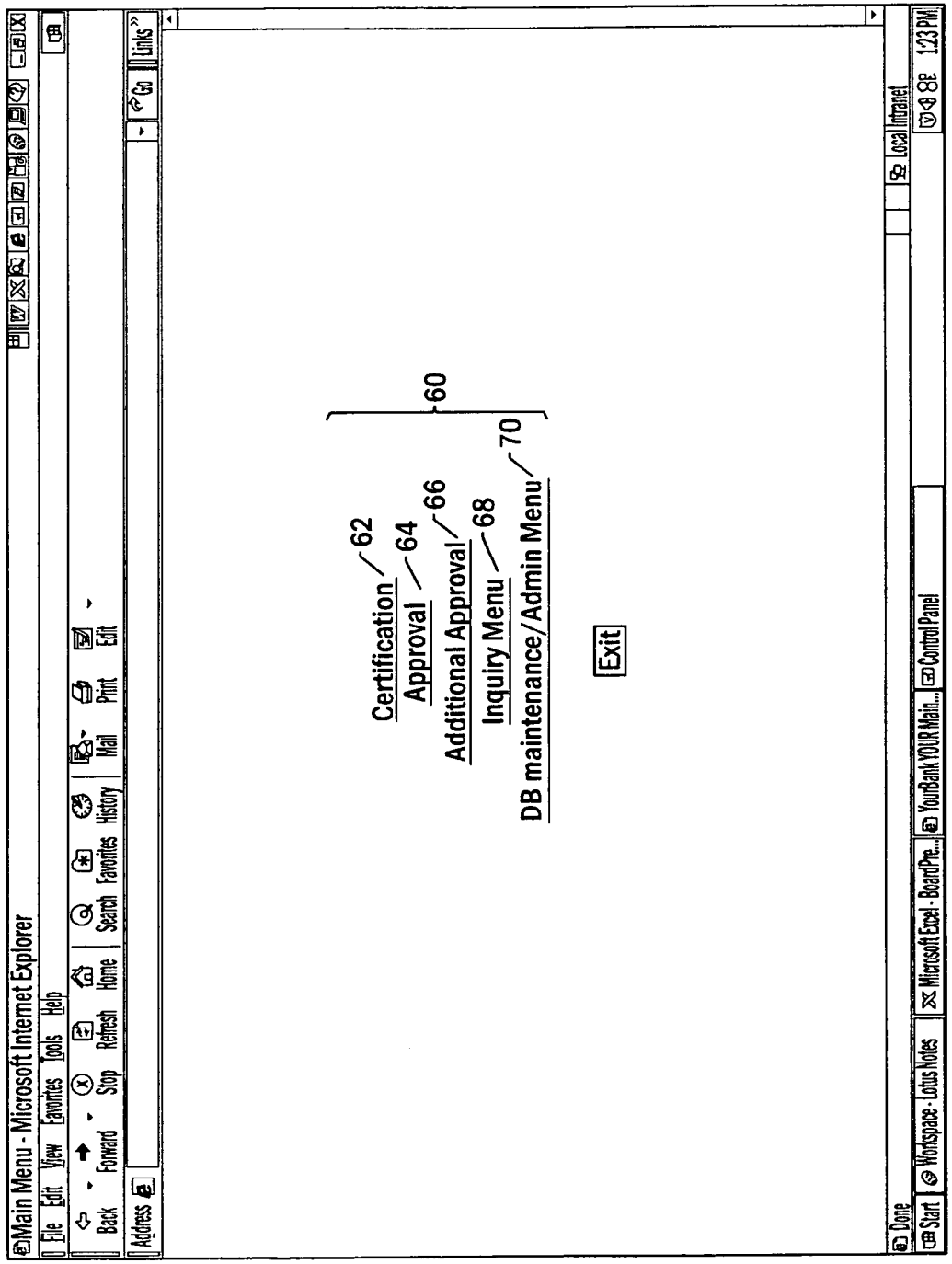
FIG. 2 is a representative display of general options available to a user of the method, computer program product and system for verifying financial data, according to one embodiment of the present invention.

FIG. 2 illustrates a set of general options 60 that may be presented to a user of the method, computer program product, and system 20 of the present invention. Which options a particular user may access depends upon the level of access defined in the user's profile. For example, if a user's profile defines that the user is authorized to certify the reconciliation of financial data for a particular account, the user will be permitted to interact with the certification screens by selecting the certification option 62 via a selection device such as a computer keyboard, a mouse or otherwise. The screens associated with the approval option 64 are available for interaction by any user whose profile specifies authorization to approve the reconciliation of an account. The screens associated with the additional approval option 66 are available for interaction by any user whose profile specifies authorization to approve any issues regarding the account that require approval in addition to the reconciliation approval. The screens associated with the inquiry menu option 68 are available for interaction by users authorized to access and view the data stored on the database, such that these users may request and view reports containing the data or portions of the data. The screens associated with the DB maintenance/Admin menu option 70 are available for interaction by users authorized to make changes to the database 28. These users are typically database administrators, but different levels of access may be defined such that certain users may have access to change portions of the data stored in the database 28. The options described above are examples of general options that may be available to users of the system 20. Other options may be added or the options described above may be combined in other embodiments of the system 20 of the present invention.

The tables stored in the database 28 may also include hierarchical lists associated with particular financial data accounts. The hierarchical list is a list of the users responsible for the integrity of the financial data in a particular account. The list includes not only the users having a duty to perform a task regarding the account, but also any users ultimately responsible for the account that should be notified if any task regarding the account is not performed, at least not within a specified timeframe. FIG. 3 is an example of one embodiment of the hierarchical list 72 for an account. The hierarchical list 72 may be created by any user of the financial data verification system 20 having access to the hierarchical list administrative function associated with the account. Thus, the user having access to the hierarchical list administrative function may select the DB maintenance/Admin Menu option 70 and would have the ability to enter or change the users listed in the hierarchy.

As FIG. 3 illustrates, the hierarchical list 72 may contain a variety of information regarding the users. For example, the hierarchical list may include the UserID 74, the relationship to the account 76, the escalation sequence 78, the user's name 80, and the email address 82 for each user. The UserID 74 is a unique combination of letters, numbers or symbols that is associated with the particular user. Other information regarding the user that is stored in the database, such as profile information, may be identified by searching for the particular UserID.

The relationship to account 76 defines the label applied to the user that corresponds to the user's responsibility regarding the account. For example, the primary certifier is responsible for reconciling the financial data stored in the account against the business' records and certifying that the reconciliation is complete. In other embodiments of the hierarchical list 72, one or more secondary certifier(s) may also be identified to serve as backup to the primary certifier. The primary approver is responsible for reviewing the certified reconcilement of the certifier and determining whether to approve the reconcilement or reject the reconcilement and require the certifier to reconcile the account again. Secondary approver (s) may also be identified to perform the reconcilement review and approval if the primary approver does not do so within a specified period of time. For example, the hierarchical list of FIG. 3 shows a secondary approver 1 and a secondary approver 2. The secondary approver 1 may be notified to perform the reconcilement review and approval if the primary approver does not do so within a specified period of time. Then, if the secondary approver 1 does not perform the reconcilement review and approval within a specified period of time, the secondary approver 2 may be notified to do so. The Business Unit Owner (BUO) is responsible for all of the data and issues associated with the account. For example, the BUO may not only be generally responsible for the financial data contained in the account, but also for maintaining the hierarchical list 72 for the account. The above BUO levels are users that are responsible for the overall account, generally in management capacity, such that they should be notified if there are issues of defined degrees of severity regarding the account.

The escalation sequence 78 represents the sequence of notifications regarding the tasks to be performed with respect to the account. Thus, the notifications may begin with the person responsible for the task, such as the certifier or approver, and continue with progressing sequence if the task continues to be uncompleted. Alternatively, more than one escalation sequence may be associated with an account. As such, one escalation sequence may govern the sequence of notifications for tasks to be performed regarding the account, while another may govern the sequence of notifications when a task is not completed within a specified timeframe. For example, an escalation sequence that governs tasks may direct the notification sequence from the certifier that completes the certification to the primary approver, while an escalation sequence that governs tasks may direct the notification sequence from a certifier that does not complete the certification within the specified timeframe directly to the BUO. The user name 80 is a list of the names of the user responsible for the account, and the email address 82 is a list of the electronic addresses for contacting the users. As will be apparent, the user names 80 and email addresses 82 are associated with the respective UserIDs 74. Alternatively, any other contact information may be listed for the users, such as any other electronic notification means or voice notification means.

The database 28 also may store notification schedule tables. The notification schedule tables specify the amount of time to wait before notifying the next user in the escalation sequence 78 when the task at issue continues to be uncompleted. For example, if the system 20 notifies the primary certifier of the account to reconcile the financial data of the account, but the system 20 does not receive an indication that the certifier has certified that the reconciliation is completed within the time specified in the notification schedule, then the next user in the escalation sequence 78, the primary approver in this example, is notified. This process continues through the escalation sequence until the system 20 receives an indication that the reconciliation is certified or until the highest level of escalation is reached.

The times specified in the notification schedule tables may vary depending upon the stage in the escalation sequence 78. For example, the time specified within which the certifier must certify that the reconciliation is completed may be different than the time specified within which the approver must approve the reconciliation. If an account has more than one escalation sequence associated with it, as described hereinabove, the times specified the notification schedule table(s) may vary depending upon the purpose of the particular escalation sequence. In addition, the times specified in the notification schedule for one account may vary from the times specified in the notification schedule table(s) for another account.

Another table that the database 28 may contain is a comments table. The comments table may store user comments regarding a particular account or the financial data in general. When users submit their comments, they may be given the option of restricting the viewability of their comments. Thus, a user may specify whether that user's comment may be viewed by all of the other users, only by the user submitting the comment, or only a specified group of users. In addition, any automatic notifications sent to users, as explained hereinbelow, may also automatically be entered in the comments table for the account at issue. For example, when the certifier is automatically notified to reconcile an account, the name of the certifier to which the notification was sent, the date the notification was sent, and the specific notification message or a general indication of the type of notification may be recorded in the comments table for the particular account.

Figure 4:
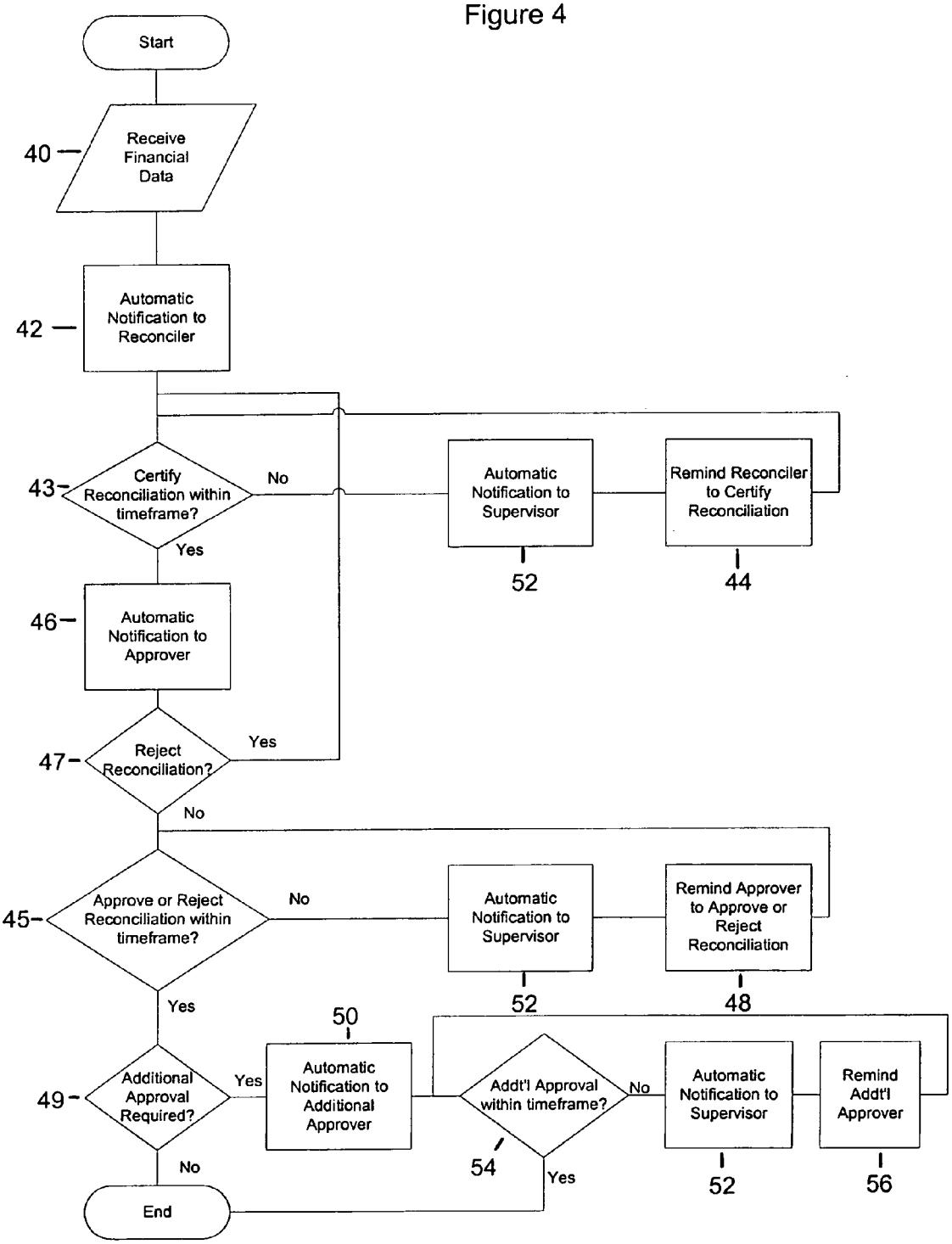
FIG. 4 is a flow diagram illustrating operations performed by the method, computer program product, and system of one embodiment of the present invention.

FIG. 4 is a flow diagram illustrating the functionality of one embodiment of the method, computer program product, and system 20 of the present invention. The process generally begins when financial data is received by the financial data verification system 20 (see block 40). The new financial data may be any type of financial data or underlying documentation regarding an account. For example, in one embodiment of the present invention, the new financial data is the documentation underlying general ledger balance sheet records maintained by the business on an ongoing basis. Therefore, the underlying documentation must be reconciled against the general ledger balance sheet records periodically to ensure that the general ledger balance sheet records are accurate.

The financial data is typically received by loading it into the database 28. The new financial data may be added as it becomes available or it may be added at regular intervals, such as at the end of a week, month, quarter or otherwise. The application program, stored on the web and application server (s), may check the database 28 continuously or on any type of periodic basis to determine when new financial data has been loaded into the database 28. Once the application program detects new financial data, the application program may determine if the financial data is associated with an account, and whether the account is associated with a hierarchical list 72.

If the system 20 locates a hierarchical list 72 for the account associated with the new financial data, the system 20 searches for contact information associated with the first user in the escalation sequence 78, generally the primary certifier in the example shown in FIG. 3. The system 20 then automatically notifies the first user that the account must be reconciled (see block 42). If the hierarchical list 72 does not contain the contact information for a user requiring notification, the system 20 may look up the user in a users table that is stored on the database 28 to determine the contact information for that user.

Once the certifier is notified, the certifier must reconcile the financial data against the general ledger of the business by any method known to those skilled in the art. Once the reconciliation is complete, the reconciliation must be certified. To certify the reconciliation, the certifier may access the application program of the system 20 through the Certification option 62, as shown in the list of general options 60 of FIG. 2. The application program then may query the database 28 for all of the accounts or financial data for which the certifier is responsible and present it to the certifier via the user interface. FIG. 5 is an example of a portion of the account information associated with a particular certifier that is presented to the certifier. The account information includes, but is not limited to, the account number 84, the account title 86, the balance in the account 88, the certification date 90, and the certifier's name 92. If the balance in the account 88 is zero, the business policy may still require that the certifier certify the reconciliation of the account. In one embodiment of the system 20 of the present invention, a box 91 may be located near an account with a zero balance that the certifier may select with a selection device. Once the box is selected, the certifier then may select the certify option 93 to certify the zero balance in the account. Alternatively, the certifier may certify the reconciliation of the zero balance in the account by proceeding as described below.

Figure 6:
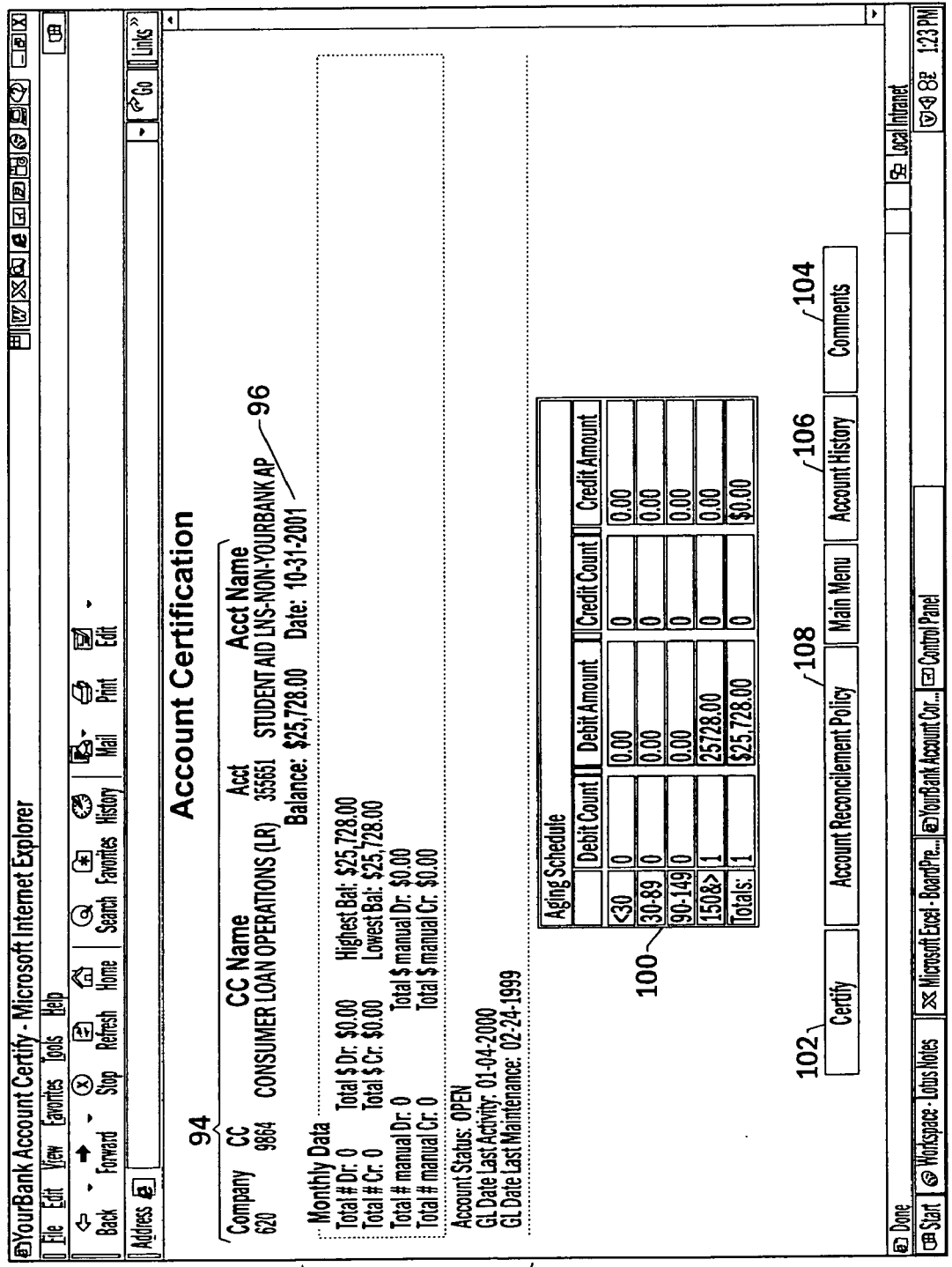
FIG. 6 is a representative display of an account certification screen for a particular account, which includes an option to record any issues associated with the account, according to one embodiment of the present invention.

When the certifier is prepared to certify that an account has been reconciled, zero balance or otherwise, the certifier may select the account number from the list of account numbers with a selection device and the account certification screen for the particular account is presented to the certifier. FIG. 6 is an example of an account certification screen for a particular account selected from the list presented in FIG. 5. The account certification screen contains the account name and number 94 in addition to the balance and date 96. The account certification screen may also contain general summary information regarding the account 98, such as the number and amount of transactions associated with the account, and the highest and lowest balance achieved during the month in question, if desired. In addition, the certifier may record certain issues associated with the account in the aging schedule 100. In this example, the aging schedule contains any debit or credit amounts that are not reconcilable at the time of the reconciliation, with the debit and credit amounts being separated based upon the relative age of the debit or credit amount shown. Therefore, the amounts are recorded such that the issue can be addressed by either the same or another user, at a later time, or at the next reconciliation, which prevents the issue from being forgotten or overlooked. Alternatively, the aging schedule may record any other type of issues associated with the account. The certifier may also add any comments or view existing comments regarding the account, as explained hereinabove, by selecting "comments" 104 with a selection device. Furthermore, the certifier may access a policy statement regarding the account reconciliation process by selecting "Account Reconcilement Policy" 108 with a selection device.

The account certification screen may also contain a link to the "account history" 106 for the account. If a certifier selects this option with a selection device, a report of the relatively recent history of the account will be presented to the certifier. An example of the account history report is shown in FIG. 7. This report may be accessed, not only by the certifier, but also by any user that may view the financial data for the account. Once the application program receives a command from the user for an account history report, the application program submits queries to the database for the account history information and then presents the historical information to the user. The account history report may also have a memo area 111 where the comments entered by users may be viewed. The account history shown in FIG. 7 is an example of a typical account history report, but any type of information associated with the account may be included. Other features also may be added to the account certification screen, if desired.

When the certifier is satisfied with the reconcilement of the account, the certifier may select the "certify" option 102 from the account certification screen depicted in FIG. 6. The application program receives the indication of the certification and immediately updates the account information in the database 28 to indicate that the reconciliation of the account is certified for the balance, on the date, and by the certifier listed in the account certification screen. Thus, when the certifier or any other user accesses the account, it will indicate that the account is certified, an example of which is shown by some of the accounts 110 illustrated in FIG. 5.

If, however, the certifier does not certify that the account is reconciled within the timeframe specified in the notification schedule (see block 43), the system 20 sends an automatic notification to the next user in the escalation sequence, as described hereinabove. In the example shown in FIG. 4, block 52 represents that when the certifier does not certify the reconciliation within the specified timeframe, an automatic notification of the lack of certification is sent to the certifier's supervisor. The certifier's supervisor then should remind the certifier to certify the reconciliation of the account (see block 44). Alternatively, if a secondary certifier is listed in the hierarchical list, the secondary certifier will be automatically notified of the lack of certification of the account, and the secondary certifier should proceed to reconcile and certify the account. If the next timeframe specified in the notification schedule passes without certification, the next user listed in the escalation sequence is then automatically notified of the lack of certification of the account. This user should remind the certifier, the certifier's supervisor and/or the secondary certifier, if appropriate, to certify the reconciliation of the account. This process continues to progress up the escalation sequence until the account is certified or the end of the escalation sequence is reached. Thus, the method, computer program product and system 20 of the present invention ensures that the correct people in a business will be aware of the lack of reconciliation of any account for which they are responsible and can take appropriate action before it is too late to remedy the situation. Moreover, the mere prospect that increasingly higher levels of management will be notified if the certification of the reconciliation is not performed in a timely manner will generally be sufficient to prompt action by the certifier.

Once the reconciliation of the account is certified, an automatic notification is sent to the user specified as the primary approver of the account in the hierarchical list 72 (see block 46). The approver then must review the reconciliation of the financial data according to any method known to those skilled in the art. After review, the approver must decide whether to approve or reject the reconciliation. The approver may access the application program of the system 20 through the Approval option 64, as shown in the list of general options 60 of FIG. 2. The application program then may query the database 28 for all of the accounts or financial data for which the approver is responsible and present them to the approver via the user interface. FIG. 8 is an example of a portion of the account information associated with a particular approver that is presented to the approver. The account information includes, but is not limited to, the account number 84, the account title 86, the balance in the account 88, the certification date 90, the certifier's name 92, the approval date 112, and the approver's name 114. In one embodiment of the system 20 of the present invention, a box 113 may be located near an account with a zero balance that the approver may select with a selection device. Once the box is selected, the approver then may select the approve option 115 to approve the reconciliation of the zero balance in the account. Alternatively, the approver may approve the reconciliation of the zero balance in the account by proceeding as described below.

Figure 9:
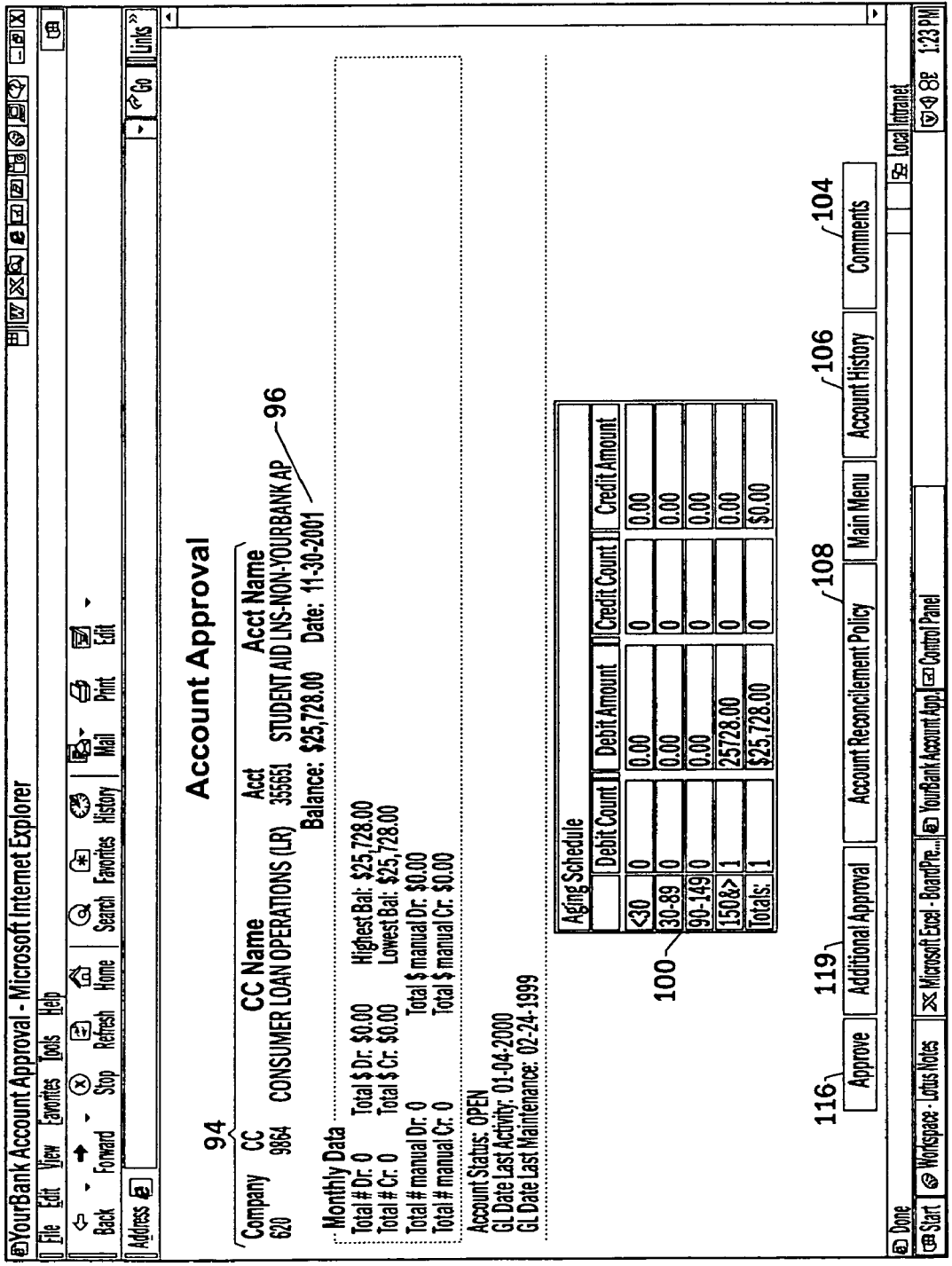
FIG. 9 is a representative display of an account approval screen for a particular account that has been certified according to one embodiment of the present invention.

When the approver is prepared to approve the reconciliation of a certified account, zero balance or otherwise, the approver may select the account number from the list of account numbers with a selection device, and an account approval screen for the particular account is presented to the approver. FIG. 9 is an example of an account approval screen for a particular account selected from the list presented in FIG. 8. The account approval screen contains the account name and number 94, in addition to the balance and date 96. The account approval screen may also contain general summary information regarding the account 98, such as the number and amount of transactions associated with the account, and the highest and lowest balance achieved during the month in question, if desired. In addition, the approver may review the issues recorded in the aging schedule 100 and/or record additional issues associated with the account in the aging schedule 100. In this example, the aging schedule contains any debit or credit amounts that are not reconcilable at the time of the reconciliation. Therefore, the amounts are recorded such that the issue can be addressed by either the same or another user, at a later time, or at the next reconciliation, and the issue will not be forgotten or overlooked. Alternatively, the aging schedule may record any other types of issues associated with the account. The approver may also add any comments or view existing comments regarding the account, as explained hereinabove, by selecting "comments" 104 with a selection device. Furthermore, the approver may access a policy statement regarding the account reconciliation process by selecting "Account Reconcilement Policy" 108 with a selection device.

The account approval screen may also contain a link to the "account history" 106 for the account. If an approver selects this option with a selection device, a report of the relatively recent history of the account will be presented to the approver, the content and process of the account history being similar to that explained hereinabove regarding the certification process. An example of the account history report is shown in FIG. 7. This report may be accessed, not only by the certifier and approver, but also by any user that may view the financial data for the account.

After reviewing the reconciliation, the approver may reject the reconciliation (see block 47). If the approver rejects the reconciliation, the approver generally provides comments by selecting the "comments" 104 option in the account approval screen of FIG. 9. These comments would typically identify the reasons for the rejection of the reconciliation. If the approver rejects the reconciliation, the approver contacts the certifier and the certifier must resolve the issues the approver identified and recertify the account, restarting the approval process. Alternatively, the application program may include a screen, similar to the account approval screen of FIG. 9, with an option for rejection of reconciliation by the approver, which triggers an automatic notification to the certifier, and totally restarts the certification and approval process.

When the approver is satisfied with the reconcilement of the account, the approver may select the "approve" option 116 from the account approval screen of FIG. 9. The application program receives the indication of the approval and immediately updates the account information in the database 28 to indicate that the reconciliation of the account is approved for the balance, on the date, and by the approver listed in the account approval screen. Thus, when the approver or any other user accesses the account, it will indicate that the account is certified and approved, an example of which is shown by some of the accounts 118 illustrated in FIG. 8.

If, however, the approver does not either approve or reject the reconciliation within the timeframe specified in the notification schedule (see block 45), the system 20 sends an automatic notification to the next user in the escalation sequence 78, as described hereinabove. In the example shown in FIG. 4, block 52 represents an automatic notification of the lack of approval sent to the approver's supervisor. The approver's supervisor then should remind the approver to review and approve or reject the reconciliation of the account (see block 48). Alternatively, if a secondary approver is listed in the hierarchical list, the secondary approver will be automatically notified of the lack of approval of the reconciliation of the account, and the secondary approver should proceed to review and approve or reject the reconciliation. If the next timeframe specified in the notification schedule passes without approval, the next user listed in the escalation sequence is then automatically notified of the lack of approval of the account. This user should remind the approver, the approver's supervisor and/or the secondary approver, if appropriate, to approve or reject the reconciliation of the account. This process continues to progress up the escalation sequence until the account is approved or the end of the escalation sequence is reached. Thus, the method, computer program product and system 20 of the present invention ensures that the correct people in a business will be aware of the lack of approval of any account for which they are responsible and can take appropriate action before it is too late to remedy the situation.

When there are certain recorded issues regarding the account, the issues may require additional approval (see block 49). The application program may be designed to identify various different types of issues as requiring additional approval. For the example shown in FIG. 9, if any debit or credit amounts are recorded in the "150 &>" category, indicating that that debit or credit amounts are at least 150 days old, the embodiment of the system 20 described in this example requires additional approval of that issue. Thus, when the application program detects that an issue in the "150 &>" category has been approved, the application program immediately sends an automatic notification to the user specified as the additional approver (see block 50). The application program may determine which user is the additional approver in various manners depending upon its configuration, such as by searching for a label designating a particular user as the additional approver in the hierarchical list for a respective account, or a label or level of control given to a specific user in the users table for the respective account designating the specific user as the additional approver. Alternatively, the application program may specify a particular stage in the escalation sequence to be the additional approver. In the example described here, the application program specifies that the additional approver is the user labeled "Above BUO Level 1," i.e., stage 6, in the hierarchical list 72.

The additional approver may access the application program of the system 20 through the Additional Approval option 66, as shown in the list of general options 60 of FIG. 2. Alternatively, the additional approver may access an additional approval screen by selecting the additional approval option 119 in the account approval screen of FIG. 9. Once the application program receives an additional approval selection, the application program may query the database 28 for all of the accounts or financial data requiring additional approval for which the additional approver is responsible and present them to the additional approver via the user interface. FIG. 10 is an example of a portion of the account information associated with a particular additional approver that is presented to the additional approver. The account information includes, but is not limited to, the account number 84, the account title 86, the issue requiring additional approval 120, the approval date 112, the approver's name 114, the additional approval data 122, and the additional approver's name 124.

When the additional approver is prepared to approve the issue, the additional approver may select the account number from the list of account numbers with a selection device, and the account approval screen for the particular account is presented to the additional approver. The screen presented may be the same screen presented to the approver or a screen containing somewhat different financial data depending upon the design of the system. In this example, the account approval screen is the same screen presented to the approver, as shown in FIG. 9, for a particular account selected from the list presented in FIG. 10. The account approval screen contains the account name and number 94, in addition to the balance and date 96. Thus, the additional approver has the same options as described hereinabove for the approver.

After reviewing the financial data in the account and the issue requiring additional approval, the additional approver may resolve the issue or decide to "write off" the issue, but either way the additional approver must additionally approve the account after deciding what to do about the issue. When the additional approver is prepared to approve the account, the additional approver may select the "additional approval" option 118 from the account approval screen. The application program receives the indication of the additional approval and immediately updates the account information in the database 28 to indicate that the issue recorded for the account is additionally approved on the date, and by the additional approver accessing the account approval screen. Thus, when the additional approver or any other user accesses the account, it will indicate that the account is approved, and additionally approved an example of which is shown by some of the accounts 126 illustrated in FIG. 10.

If, however, the additional approver does not approve the issue requiring additional approval within the timeframe specified in the notification schedule (see block 54), the system 20 may send an automatic notification to the next user in the escalation sequence 78, as described hereinabove. In the example shown in FIG. 4, block 52 represents an automatic notification of the lack of additional approval sent to the approver's supervisor. The additional approver's supervisor then should remind the additional approver to review, determine how to handle, and approve the issue regarding the account (see block 56). If the next timeframe specified in the notification schedule passes without additional approval, the next user listed in the escalation sequence may then be automatically notified of the lack of additional approval of the issue regarding the account. This user should remind the additional approver, and any other appropriate individuals to handle the issue and approve the account. Alternatively, this user may resolve the issue or determine how to handle it and submit the additional approval, if appropriate. This process may continue to progress up the escalation sequence until the issue is additionally approved or the end of the escalation sequence is reached. Therefore, the method, computer program product and system 20 of the present invention ensures that the correct people in a business will be aware of the issues regarding any of the accounts for which they are responsible and can work to resolve the issue before it is too late.

Users of the system 20 for financial verification can also request and obtain reports regarding the financial data stored in the database 28. If the embodiment of the system 20 includes user profiles, and the requesting user's profile information specifies a certain level of access to the financial data, then the reports will only contain the financial data accessible by the requesting user. Thus, the application program may check the requesting user's profile for the level of access defined for the user prior to creating the requested report.

Users may request a predefined type of report or they may request a custom report. For example, to access the reporting functionality of the system 20, the user may select the "Inquiry Menu" option 68 from the list of options 60 shown in FIG. 2. The user then may select a predefined report, such as a management report, having a table or other presentation of information that is frequently utilized by the business.

FIG. 11 is an example of one type of predefined report that may be available to users of the system 20. The report separates the accounts by Business Unit Owner (BUO) 128 and presents information regarding the number of accounts 130, the balance in the accounts 132, the percentage of the accounts certified 134 and approved 136, and the recorded issues regarding each account 138. In addition, the report may include a link 140 near each BUO name to immediately contact the BUO. The viewer of the report may also be able to select a BUO name 142 with a selection device in order to see more detail regarding the particular accounts owned by the BUO. These type of reports permit the users of the system 20 to immediately assess the status of the financial data verification process and identify any BUO with accounts that are not certified and/or approved, or that have outstanding issues associated with the accounts.

Users also may submit a custom inquiry to the system 20 to obtain specific categories of information from the financial data stored in the database 28. FIG. 12 is an example of a custom inquiry screen that may be available to users of the system 20. The custom inquiry screen may contain prompts for the requesting user to enter specifications regarding any type of available information. Once the user enters or selects the type of information desired for a custom report, the user may select the "submit query" option 144. The application program then queries the database 28 for the requested information and populates a report to present the information to the requesting user via the user interface, assuming that the user is permitted to access the requested information. FIG. 13 is an example of a custom report that may be created from the custom inquiry submitted from the screen depicted in FIG. 12. The report may also contain links associated with the information in the report that may be selected to view further details regarding the selected piece of information.

Thus, the method, computer program product, and system of the present invention provide immediate access to a variety of information available to users regarding the status of the financial data verification process, the issues related to the financial data and/or accounts, and the comments of other users regarding the financial data and/or account. The automatic notification functionality of the method, computer program product, and system of the present invention also ensures that the users responsible for the account are notified of their duties regarding the account, such that the tasks are not forgotten or overlooked. In addition, the completion or non-completion of the duties may be tracked and reported to the appropriate individual. Therefore, the functionality provided by the method, computer program product and system of the present invention permit businesses to efficiently assess the status of the financial data and to measure the risk associated with the financial data that they manage, saving time and labor expended by businesses that would otherwise have to manually make these determinations.

The system 20 of the present invention and, in particular, the client component 22, web and application server(s), and database 28 are typically embodied by one or more processing elements and associated memory device(s), all of which are commonly comprised by a computer system or the like, as described above. As such, the system of the present invention generally operates under control of a computer program product, including the application program, to provide the functionality described hereinabove in conjunction with the various components of the system, according to another aspect of the present invention. The computer program product for verifying financial data includes a computer-readable storage medium, such as the non-volatile storage medium, and computer-readable program code portions, such as a series of computer instructions, embodied in the computer-readable storage medium.

In this regard, FIGS. 1 and 4 are block diagrams, flowcharts or other schematic representations of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer program product for verifying financial data, the computer program product comprising a computer-readable storage medium having computer-readable program code portions stored therein, the computer-readable program code portions comprising:

a first executable portion capable of providing a hierarchical list of users responsible for verification of at least a portion of the financial data, and wherein the hierarchical list defines relationships among the users;

a second executable portion capable of automatically notifying at least one user, based upon the hierarchical list, to reconcile the financial data and for receiving a certification from the at least one user upon completion of the reconciliation, wherein said second executable portion is also capable of automatically notifying at least one user, based upon the hierarchical list, to approve the reconciled financial data once the certification of the completion of the reconciliation of the financial data is received, wherein said second executable portion is also capable of receiving an indication from the at least one user once the financial data is approved;

and a third executable portion capable of recording any certification and approval of the financial data on the computer-readable storage medium, wherein said third executable portion is also capable of recording comments by at least one of the users performing one of the certification and approval and any user accessing the recordation of the certification and approval of the financial data.

2. The computer program product of claim 1, wherein the financial data is organized into a plurality of accounts, wherein each account is associated with at least one user for certification and at least one user for approval, and wherein the computer program product further comprises a fourth executable portion capable of permitting the least one user notified to reconcile the financial data access to the financial data required to reconcile the account.

3. The computer program product of claim 1, further comprising:
a fourth executable portion capable of providing profile information defining a level of access to the financial data available to each user;
and a fifth executable portion capable of preparing reports associated with the financial data including an indication of any certification and approval of the financial data, wherein preparing reports comprises preparing reports for a respective user having content based upon the level of access defined by the profile information for the respective user.

4. The computer program product of claim 3, wherein said fifth executable portion is also capable of preparing reports containing links to other information associated with the financial data presented in the reports.

5. The computer program product of claim 1, wherein said second executable portion is also capable of automatically notifying at least one user by electronic mail.

6. The computer program product of claim 1, wherein said third executable portion is further capable of recording comments by the user that may be viewed by all other users.

7. The computer program product of claim 1, wherein said third executable portion is further capable of recording comments by the user that may be viewed only by the user that made the comments.

8. The computer program product of claim 1, wherein said third executable portion is further capable of recording comments by the user that may be viewed only by a specified group of at least one user.

9. The computer program product of claim 1, wherein said third executable portion is also capable of recording issues associated with the financial data.

10. The computer program product of claim 9, wherein said second executable portion is also capable of automatically notifying at least one user, based upon the hierarchical list, when an issue associated with the financial data is without resolution for a specified timeframe.

11. The computer program product of claim 1, further comprising a fourth executable portion capable of detecting when new financial data is received and generating the automatic notification of the at least one user responsible for certification in response to the detection of new financial data.

12. The computer program product of claim 1, wherein said second executable portion is also capable of automatically notifying at least one user, based upon the hierarchical list, when the financial data is without at least one of certification and approval for a specified timeframe.

13. The computer program product of claim 12, wherein said second executable portion is further capable of automatically notifying users based upon a schedule, wherein the schedule specifies a timeframe to wait before notifying the next user on the hierarchical list when the financial data continues to be without at least one of certification and approval.

14. A system for verifying financial data, comprising:
a client comprising a browser for receiving input from and for providing output to a user;
a server in communication with said client via a computer network;
a memory device in communication with said server for storing a hierarchical list of users responsible for verification of at least a portion of the financial data, wherein the hierarchical list defines relationships among the users;
a processing element in communication with said server, said processing element capable, via the browser and computer network, of automatically notifying at least one user, based upon the hierarchical list, to reconcile the financial data and of receiving a certification from the at least one user upon completion of the reconciliation, wherein said processing element is further capable of automatically notifying at least one user via the browser and the computer network, based upon the hierarchical list, to approve the reconciled financial data once the certification of the completion of the reconciliation of the financial data is received, wherein said processing element is also capable of receiving an indication via the browser and the computer network from the at least one user once the financial data is approved, and wherein said processing element is further capable of recording any reconciliation and approval of the financial data.

15. The system of claim 14, wherein the financial data is organized into a plurality of accounts, wherein each account is associated with at least one user for certification and at least one user for approval, and wherein said processing element is further capable of permitting the least one user notified to reconcile the financial data access to the financial data required to reconcile the account.

16. The system of claim 14, wherein said memory device also stores profile information defining a level of access to the financial data available to each user, and wherein said processing element is further capable of preparing reports associated with the financial data including an indication of any certification and approval of the financial data, wherein preparing reports comprises preparing reports for a respective user having content based upon the level of access defined by the profile information for the respective user.

17. The system of claim 16, wherein said processing element is also capable of preparing reports containing links to other information associated with the financial data presented in the reports.

18. The system of claim 14, wherein said processing element is further capable of automatically notifying at least one user by electronic mail.

19. The system of claim 14, wherein said processing element is further capable of recording comments entered via the browser and the computer network by at least one of the user performing one of the certification and approval and a user accessing the recordation of the certification and approval of the financial data.

20. The system of claim 19, wherein said processing element is also capable of recording comments entered via the browser and the computer network by the user that may be viewed by all other users.

21. The system of claim 19, wherein said processing element is also capable of recording comments entered via the browser and the computer network by the user that may be viewed only by the user that made the comments.

22. The system of claim 19, wherein said processing element is also capable of recording comments entered via the browser and the computer network by the user that may be viewed only by a specified group of at least one user.

23. The system of claim 14, wherein said processing element is further capable of recording issues associated with the financial data.

24. The system of claim 23, wherein said processing element is also capable of automatically notifying at least one user via the browser and computer network, based upon the hierarchical list, when an issue associated with the financial data is without resolution for a specified timeframe.

25. The system of claim 14, wherein said processing element is further capable of detecting when new financial data is received and generating the automatic notification of the at least one user responsible for certification in response to the detection of the new financial data.

26. The system of claim 14, wherein said processing element is also capable of automatically notifying at least one user via the browser and computer network, based upon the hierarchical list, when the financial data is without at least one of certification and approval for a specified timeframe.

27. The system of claim 26, wherein said processing element is further capable of automatically notifying users via the browser and computer network, based upon a schedule, wherein the schedule specifies a timeframe to wait before notifying the next user on the hierarchical list when the financial data continues to be without at least one of certification and approval.

28. A method for verifying financial data, comprising:
providing a hierarchical list of users responsible for verification of at least a portion of the financial data, wherein the hierarchical list defines relationships among the users;
detecting when new financial data is received and generating an automatic notification for at least one user responsible for certification in response to the detection of new financial data;
automatically notifying at least one user, using a computer, based upon the hierarchical list, to reconcile the financial data;
analyzing the financial data to determine if the financial data is reconcilable and certifying the reconciliation of the financial data;
automatically notifying at least one user, based upon the hierarchical list, to approve the reconciled financial data once the financial data has been certified;
automatically notifying at least one user, based upon the hierarchical list, when the financial data is without at least one of certification and approval for a specified timeframe;
recording any reconciliation and approval of the financial data, wherein recording any reconciliation and approval of the financial data comprises recording issues associated with the financial data;
and automatically notifying at least one user, based upon the hierarchical list, when an issue associated with the financial data is without resolution for a specified timeframe.

29. The method of claim 28, wherein the financial data is organized into a plurality of accounts, wherein each account is associated with at least one user for certification and at least one user for approval, and wherein the method further comprises permitting the at least one user notified to reconcile the financial data access to the financial data required to reconcile the account.

30. The method of claim 28, further comprising:
providing profile information defining a level of access to the financial data available to each user;
and preparing reports associated with the financial data including an indication of any certification and approval of the financial data, wherein preparing reports comprises preparing reports for a respective user having content based upon the level of access defined by the profile information for the respective user.

31. The method of claim 30, wherein preparing reports associated with the financial data comprises preparing reports containing links to other information associated with the financial data presented in the reports.

32. The method of claim 28, wherein automatically notifying at least one user, based upon the hierarchical list, when an issue associated with the financial data is without resolution for a specified timeframe comprises automatically notifying users based upon a schedule, wherein the schedule specifies a timeframe to wait before notifying the next user on the hierarchical list when the financial data continues to be without at least one of certification and approval.

33. The method of claim 28, wherein recording any reconciliation and approval of the financial data comprises recording comments by the user performing one of the reconciliation and the approval and by a user accessing the recordation of the certification and approval of the financial data.

* * * * *